US012764195B2

(12) United States Patent
Fox et al.

(10) Patent No.: US 12,764,195 B2
(45) Date of Patent: Oct. 13, 2026

(54) OPTIMIZING LEGACY PROTOCOLS FOR INTERNET OF THINGS DEVICES

(71) Applicant: International Business Machines Corporation, Armonk, NY (US)

(72) Inventors: Jeremy R. Fox, Georgetown, TX (US); Martin G. Keen, Cary, NC (US); Su Liu, Austin, TX (US); Zachary Augustus Silverstein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 19/007,662

(22) Filed: Jan. 2, 2025

(65) Prior Publication Data

US 2026/0189633 A1 Jul. 2, 2026

(51) Int. Cl.
*H04L 67/50* (2022.01)
*G06N 20/00* (2019.01)
*G16Y 40/10* (2020.01)

(52) U.S. Cl.
CPC ............. *H04L 67/50* (2022.05); *G06N 20/00* (2019.01); *G16Y 40/10* (2020.01)

(58) Field of Classification Search
CPC ......... H06L 67/12; H06L 67/50; G06N 20/00; G06N 7/023; G16Y 40/10; G16Y 30/00; G16Y 30/10; H04L 63/105; H04L 63/1433; G06F 12/0811
USPC .......................................................... 709/203
See application file for complete search history.

(56) References Cited

U.S. PATENT DOCUMENTS

| | | | | |
|---|---|---|---|---|
| 10,572,312 B2 * | 2/2020 | Wang | ...................... | H04W 4/70 |
| 11,415,425 B1 * | 8/2022 | Merchant | ................ | H04L 41/16 |
| 2013/0159479 A1 * | 6/2013 | Vasseur | ................. | H04L 45/302<br>709/221 |
| 2020/0090070 A1 * | 3/2020 | Bhattacharyya | ....... | G06N 7/023 |
| 2020/0150644 A1 * | 5/2020 | Cella | .................. | G05B 23/0283 |
| 2023/0171276 A1 * | 6/2023 | Bisht | ................... | H04L 63/1441<br>726/23 |

(Continued)

OTHER PUBLICATIONS

"IoT solutions", IoT and IBM Cloud® are creating opportunities for growth, Feb. 28, 2025, 06 pages, https://www.ibm.com/cloud/internet-of-things.

(Continued)

*Primary Examiner* — James N Fiorillo
(74) *Attorney, Agent, or Firm* — Yee & Associates, P.C.

(57) ABSTRACT

A computer-implemented method for managing Internet of Things (IoT) protocols. A processor set continuously monitoring a number of IoT devices to collect a set of data from the number of IoT devices. The processor set trains a number of machine learning models using the set of data as training data. The processor set performs predictive analysis using the number of machine learning models to determine state of each protocol for the number of IoT devices based on real-time data from the set of data. The processor set identifies a number of legacy protocols from the protocols for the number of IoT devices based on the states of protocols for the number of IoT devices using the number of machine learning models. The processor set migrates the number of legacy protocols to a number of new protocols to optimize performance for the number of IoT devices.

20 Claims, 5 Drawing Sheets

(56) References Cited

U.S. PATENT DOCUMENTS

| | | | | |
|---|---|---|---|---|
| 2023/0208869 | A1 * | 6/2023 | Bisht | G06N 7/01<br>726/23 |
| 2023/0336021 | A1 * | 10/2023 | Cella | G01R 21/133 |
| 2025/0007981 | A1 * | 1/2025 | Virgen | G16Y 30/00 |
| 2025/0363185 | A1 * | 11/2025 | Blanchard | G06F 17/11 |
| 2025/0392614 | A1 * | 12/2025 | Koral | H04L 63/1433 |
| 2026/0010476 | A1 * | 1/2026 | Cooper | G06F 12/0811 |

OTHER PUBLICATIONS

"Matter (standard)," Wikipedia, printed Jul. 10, 2024, 7 pages. https://en.wikipedia.org/wiki/Matter_(standard).

"Matter The Foundation for Connected Things," csa: connectivity standards alliance, printed: Jul. 10, 2024, 8 pages. https://csa-iot.org/all-solutions/matter/.

Authors et al., "A Method and System to Use a Large Language Model to Identify the Usage Context for a 3D Printed Object and Dynamically Adapt the SLT Model", IP.com No. IPCOM000274307D, Apr. 30, 2024, 06 pages.

Authors et al., "A Method to Assess Large Number of Enterprise Applications for Cloud Affinity", IP.com No. IPCOM000263007D, Jul. 22, 2020, 06 pages.

Authors et al., "Al-Driven Meeting Readiness Assistant", IP.com No. IPCOM000274605D, Jun. 18, 2024, 06 pages.

Authors et al., "Integrated System and Method for Efficient Energy Utilization and Smart Grid Rebalancing for IoT Devices", IP.com No. IPCOM000273945D, Mar. 7, 2024, 11 pages.

Corser et al., "Internet of Things (IOT) Security Best Practices", IEEE Internet Technology Policy Community White Paper, Feb. 2017, 17 pages.

El-Hajj et al., "A Survey of Internet of Things (IOT) Authentication Schemes t", Sensors, 2019, 19(5): 1141, pp. 1-43. doi:10.3390/s19051141.

Henke, C., "A Comprehensive Guide to loT Protocols," emnify, Mar. 11, 2022, 25 pages. https://www.emnify.com/ iot-glossary/guide-iot-protocols.

John Ashok, "Internet of Things (IOT): Systems and Applications", NTL Technology, ISBN: 978-81-953929-2-6, Feb. 2023, 200 pages.

Khattach et al., "A survey on AI Approaches for Internet of Things Devices Failure Prediction", E3S Web of Conferences 469, 00061 (2023) https://doi.org/10.1051/e3sconf/202346900061 ICEGC, 2023, 10 pages.

Rajagopalan et al., "Fall Prediction and Prevention Systems: Recent Trends, Challenges, and Future Research Directions", Sensors, 2017, 17 pages, doi: 10.3390/s17112509.

Verge Staff, The Verge's best of CES 2023, The Verge, Jan. 7, 2023, 5 pages. https://www.theverge.com/23539309/ces-2023-best-of-tech-concept-samsung-bmw-matter.

* cited by examiner

OPTIMIZING LEGACY PROTOCOLS FOR INTERNET OF THINGS DEVICES

BACKGROUND

The disclosure relates generally to optimizing legacy protocols for internet of things (IoT) devices.

IoT devices are physical objects embedded with sensors, software, and other technologies that enable them to connect and exchange data with other devices and systems over the internet. These IoT devices are designed to collect, send, and receive data autonomously to create an interconnected network of devices. In this case, IoT devices can be used for a wide range of applications. For example, IoT devices can be used for consumer gadgets to industrial machinery for improved efficiency, automation, and enhanced data-driven decision-making.

One major feature of IoT devices is their ability to operate independently or as part of a broader network. Many IoT devices are designed to work with minimal human intervention and autonomously gather data and send the gathered data to a centralized system for further analysis. For example, IoT-enabled thermostats can adjust temperature settings based on user preferences or environmental conditions without needing direct input from the users.

In addition, IoT devices use IoT protocols as communication standard to enable data exchanges between IoT devices, applications, and platforms to accommodate diverse requirements for IoT environments. In this case, IoT protocols play a fundamental role in facilitating secure, efficient, and scalable IoT networks that can connect millions of devices in real-time or near-real-time.

SUMMARY

According to one illustrative embodiment, a computer-implemented method for managing Internet of Things (IoT) protocols is provided. A processor set continuously monitoring a number of IoT devices to collect a set of data from the number of IoT devices. The set of data is associated with protocols and performance for the number of IoT devices. The processor set trains a number of machine learning models using the set of data as training data. The processor set performs predictive analysis using the number of machine learning models to determine a state of each protocol for the number of IoT devices based on real-time data from the set of data. The processor set identifies a number of legacy protocols from the protocols for the number of IoT devices based on the states of the IoT protocols for the number of IoT devices using the number of machine learning models. The processor set migrates the number of legacy protocols to a number of new protocols to optimize performance for the number of IoT devices. According to other illustrative embodiments, a computer system and a computer program product for managing Internet of Things (IoT) protocols are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
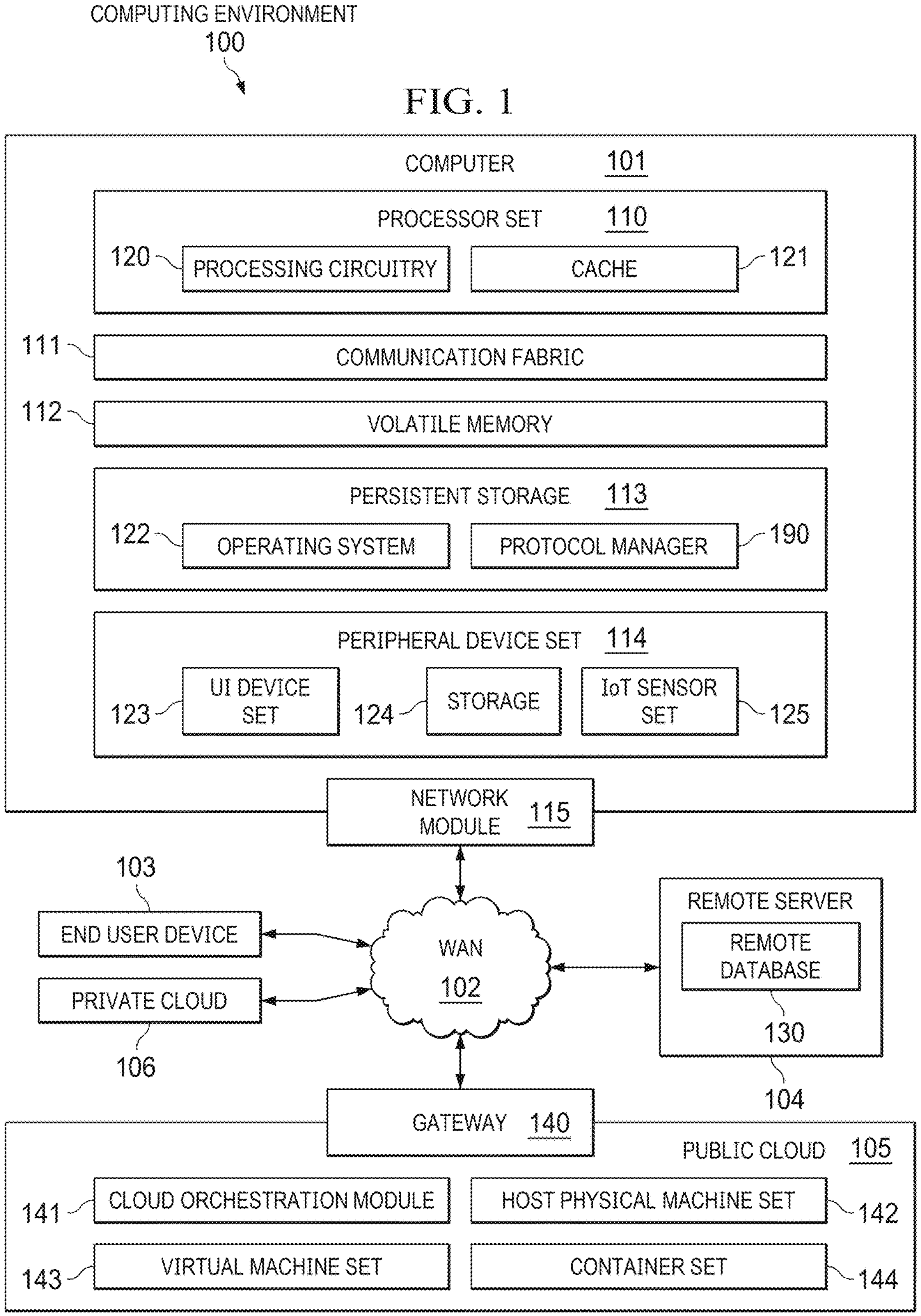
FIG. 1 is a pictorial representation of a computing environment in which illustrative embodiments may be implemented.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as protocol manager 190. In addition to protocol manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and protocol manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in protocol manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in protocol manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that legacy protocols are older communication standards or sets of rules that govern data exchange across networks. The illustrative embodiments also recognize and take into account that legacy protocols often lack security and efficiency since they were developed in earlier stages of internet and network technologies.

The illustrative embodiments also recognize and take into account that the growth of IoT devices has created complexities in managing IoT protocols. For example, industries like manufacturing, healthcare, transportation, and agriculture face challenges integrating diverse devices and networks.

The illustrative embodiments also recognize and take into account that IoT protocols can be legacy protocols that lead to suboptimal performance, such as communication bottlenecks and increased latencies for IoT devices.

Thus, illustrative embodiments of the present invention provide a computer implemented method, computer system, and computer program product for managing IoT protocols. In one illustrative example, a computer implemented method manages IoT protocols. A processor set continuously monitoring a number of IoT devices to collect a set of data from the number of IoT devices. The set of data is associated with protocols and performance for the number of IoT devices. The processor set trains a number of machine learning models using the set of data as training data. The processor set performs predictive analysis using the number of machine learning models to determine a state of each protocol for the number of IoT devices based on real-time data from the set of data. The processor set identifies a number of legacy protocols from the protocols for the number of IoT devices based on the states of the IoT protocols for the number of IoT devices using the number of machine learning models. The processor set migrates the number of legacy protocols to a number of new protocols to optimize performance for the number of IoT devices. According to other illustrative embodiments, a computer system and a computer program product for managing Internet of Things (IoT) protocols are provided.

Figure 2:
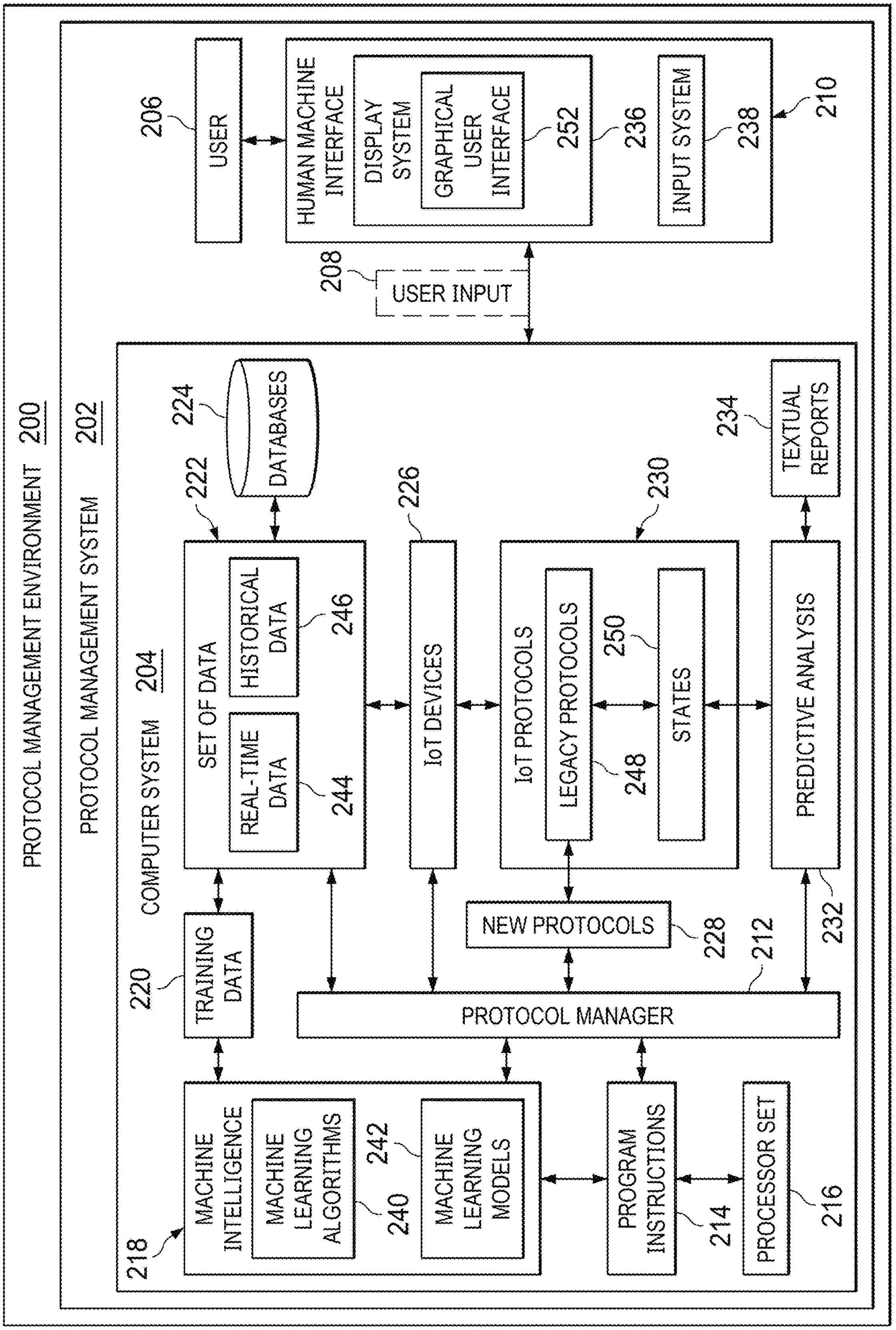
FIG. 2 is an illustration of a block diagram of a protocol management environment in accordance with an illustrative embodiment.

With reference now to FIG. 2, an illustration of a block diagram of a protocol management environment is depicted in accordance with an illustrative embodiment. In this illustrative example, protocol management environment 200 includes components that can be implemented in hardware such as the hardware shown in computing environment 100 in FIG. 1.

In this illustrative example, protocol management system 202 in protocol management environment 200 uses protocol manager 212 to identify legacy protocols 248 from IoT protocols 230 and migrate legacy protocols 248 to new protocols 228. In this illustrative example, protocol management system 202 includes computer system 204 which includes protocol manager 212. Protocol manager 212 is located in computer system 204. Protocol manager 212 may be implemented using protocol manager 190 in FIG. 1.

Protocol manager 212 can be implemented in software, hardware, firmware, or a combination thereof. When software is used, the operations performed by protocol manager 212 can be implemented in program instructions configured to run on hardware, such as a processor unit. When firmware is used, the operations performed by protocol manager 212 can be implemented in program instructions and data and stored in persistent memory to run on a processor unit. When hardware is employed, the hardware can include circuits that operate to perform the operations in protocol manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

As depicted, computer system 204 includes machine intelligence 218. Machine intelligence 218 can include machine learning models 242 and machine learning algorithms 240. Machine learning models 242 is a branch of artificial intelligence (AI) that enables computers to detect patterns and improve performance without direct programming commands. Rather than relying on direct input commands to complete a task, machine learning models 242 relies on input data. The data is fed into the machine, one of machine learning algorithms 240 is selected, parameters for the data are configured, and the machine is instructed to find patterns in the input data through optimization algorithms. The data model formed from analyzing the data is then used to predict future values.

Machine intelligence 218 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching machine intelligence 218.

Machine intelligence 218 can be implemented using one or more systems such as an artificial intelligence system, a neural network, a generative neural network, a Bayesian network, an expert system, a fuzzy logic system, a genetic algorithm, or other suitable types of systems. Machine learning models 242 and machine learning algorithms 240 may make computer system 204 a special purpose computer for identifying legacy protocols 248 from IoT protocols 230 for IoT devices 226.

Machine learning model 242 involves using machine learning algorithms 240 to build computation models based on samples of data. The samples of data used for training are referred to as training data or training datasets. Machine intelligence 218 can make predictions without being explicitly programmed to make these predictions. Machine intelligence 218 can be used for training and retraining computation models for a number of different types of applications. These applications include, for example, medicine, financial services, healthcare, speech recognition, computer vision, or other types of applications.

In this illustrative example, machine learning algorithms 240 can include supervised machine learning algorithms and unsupervised machine learning algorithms. Supervised machine learning can train machine learning models using data containing both the inputs and desired outputs. Examples of machine learning algorithms include Gradient Boosting algorithm, Autogressive Integrated Moving AVERAGE (ARIMA), XGBoost, K-means clustering, and Random Forest algorithm. In this illustrative example, Gradient Boosting algorithm and Random Forest algorithm can be specifically used for classification tasks and ARIMA can be used for handling seasonal variations in time-series prediction.

In this illustrative example, machine learning models 242 can be retrained or updated using new data or outputs generated by machine learning models 242 such that parameters in machine learning algorithm selected for machine learning models 242 can be adjusted to improve accuracy and efficiency of machine learning models 242.

In this illustrative example, protocol manager 212 can be used to continuously monitor IoT devices 226 to collect set of data 222 from IoT devices 226. For example, protocol manager 212 can use cumulative sum control chart (CUSUM) for real-time monitoring, especially for detecting shifts in time-series data. As depicted, IoT devices 226 are physical objects embedded with sensors, software, and other technologies that allow the devices to connect and exchange data over internet or other networks. In this illustrative example, IoT devices 226 can be used to collect, process, and share data autonomously. For example, IoT devices 226 can be smart home devices such as thermostats, lights, locks, wearables such as fitness trackers and smart glasses, industrial IoT devices such as asset trackers, maintenance sensors, or any other devices that can be used to collect data and exchange data over the internet.

In this illustrative example, protocol manager 212 can further use a number of pre-defined monitoring threshold for monitoring IoT devices 226. The monitoring thresholds are predefined limits to trigger alerts or actions when certain metrics or performance indicators exceed or fall below specific values. For example, the number of pre-defined monitoring threshold can be associated with memory usage, security monitoring, connection pool monitoring, or any metric associated with performance and operations of IoT devices 226.

In this illustrative example, set of data 222 can be bifurcated into two streams include real-time data 244 and historical data 246. Real-time data 244 includes data that is collected, processed and available for use immediately after collection while historical data 246 includes information that is collected over time to represent a log of events, activities, or measurement from various periods. In this illustrative example, set of data 222 can be collected using a data ingestion pipeline and set of data 222 can be tagged with metadata such as device type and industry. For example, set of data 222 can be collected using Apache Kafka®'s Application Programming Interface (API). In this illustrative example, set of data 222 can be continuously updated in real-time using data received from IoT devices 226 using RESTful APIs.

In this illustrative example, real-time data 244 and historical data 246 can include data associated with IoT protocols 230 and performance for IoT devices 226. Real-time data 244 and historical data 246 can include information associated with functioning, communication quality, responsiveness, and any other information associated with IoT devices 226. For example, real-time data 244 and historical data 246 can include latency, bandwidth usage, packet loss, signal strength, memory usage, protocol errors, firmware errors, retry count, encryption status, or authentication logs.

In this illustrative example, protocol manager 212 can normalize set of data 222 into standard format and detect outliers to flag abnormal data points. Subsequently, protocol manager 212 stores real-time data 244 and historical data 246 into different databases in databases 224. Databases 224 are digital repositories that include structed collections of data that can be accessed and managed electronically. In this illustrative example, protocol manager 212 can store real-time data 244 in a low-latency, high-throughput database while historical data 246 can be stored in a database that is capable of handling more complex, time-aggregated queries. In this illustrative example, Apache Cassandra® and Snowflake® can be configured in distributed setup for database reliability and fault tolerance.

Protocol manager 212 can use set of data 222 to generate training data 220 for training machine learning models 242. In this example, machine learning models 242 that are trained using training data 220 can be utilized to recognize patterns and trends in performances for IoT devices and thereby identify protocols from IoT protocols 230 that are legacy protocols. In this illustrative example, protocol manager 212 can further extract features from set of data 222. For example, protocol manager 212 can extract features such as average latency, packet loss percentage, and device uptime from set of data 222 and includes the extracted features to be part of training data 220. In this illustrative example, cross-validation techniques such as k-fold cross-validation can be applied to mitigate overfitting.

IoT protocols 230 are communication standards and technologies that enable IoT devices 226 to transmit, receive, and interpret data. IoT protocols 230 are essential for establishing reliable connections between devices in IoT devices 226. In this example, IoT protocols 230 can include application layer protocols such as Message Queuing Telemetry Transport Protocol (MQTT), Constrained Application Protocol (CoAP), Hypertext Transfer Protocol (HTTP), network layer protocols such as Routing Protocol for Low-power and Lossy Networks (RPL), data link and physical layer protocols such as Bluetooth protocol, Zigbee, Z-wave, long-range communication protocols such as protocols for Long Range Wide Area Network (LoRaWan), Narrowband IoT (narrowband IoT), or security protocols such as datagram transport layer security (DTLS) and Secure Sockets Layer/Transport Layer Security (SSL/TLS).

In this illustrative example, computer system 204 and protocol manager 212 can utilize Message Queuing Telemetry Transport (MQTT) protocol and Constrained Application Protocol (CoAP) for device communication to accommodate a wide variety of IoT devices and communication protocols.

In this illustrative example, protocol manager 212 can utilize machine learning models 242 to perform predictive analysis 232. Predictive analysis 232 is a data analysis technique to forecast future outcomes based on set of data 222. In other words, protocol manager 212 can use real-time data 244 as input for machine learning models 242 to predict performance for IoT devices 226 as well as conditions for IoT protocols 230 to provide insights for protocol health, suggestions for upgrades, and predictions on system performance.

In this example, protocol manager 212 determines states 250 for IoT protocols 230 by determining a state for each protocol from IoT protocols 230 based on predictive analysis 232. States 250 for IoT protocols represent conditions of communication or data transfers between devices from IoT devices 226. For example, states 250 can include information such as network availability, connection stability, transmission failures, packet losses, network interruptions, or any information associated with performance of an IoT device that utilizes particular IoT protocol.

In this illustrative example, protocol manager 212 can identify legacy protocols 248 from IoT protocols 230. Legacy protocols 248 are older communication protocols that were widely used in the past but are either outdated or becoming obsolete due to advancements in technology. In other words, protocol manager 212 can identify old communication protocols utilized by IoT devices 226 by determining states 250 for IoT protocols 230 based on set of data 222 that are associated with performance and operation of IoT devices 226.

Subsequently, protocol manager 212 can identify new protocols 228 to replace legacy protocols 248 in IoT protocols 230. In this illustrative example, new protocols 228 can be identified by analyzing IoT devices 226 to determine requirements of usage for IoT devices 226. For example, new protocols 228 can be identified by comparing IoT devices from IoT devices 226 that are using legacy protocols 248 with other similar devices that migrated to new protocols. In this example, new protocols 228 can be identified based on metrics such as transfer rate, power consumption, cost, environment, bandwidth needs, implementation complexity, network topology, interoperability, range requirements, and reliability.

As a result, protocol manager 212 can migrate legacy protocols 248 to new protocols 228 for optimizing performance and efficiency for IoT devices 226.

In this illustrative example, user 206 can interact with computer system 204 through user inputs to computer system 204. For example, computer system 204 can receive user input 208 that defines monitoring thresholds for monitoring IoT devices 226.

In this illustrative example, user input 208 can be generated by user 206 using human machine interface (HMI) 210. As depicted, human machine interface 210 includes display system 236 and input system 238. Display system 236 is a physical hardware system and includes one or more display devices on which graphical user interface 252 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information. For example, user 206 can view textual reports 234 generated based on predictive analysis 232 to determine conditions for IoT protocols 230 through graphical user interface 252. In this example, textual reports 234 can include detailing insights into protocol health, readiness for migration, and recommendations for IoT protocols 230. In addition, protocol manager 212 can also create dashboards, charts, and graphs to be displayed to user 206 through graphical user interface 252.

In this example, user 206 is a person that can interact with graphical user interface 252 through user input 208 generated by input system 238. Input system 238 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In one illustrative example, one or more solutions are present that overcome a problem with migrating legacy protocols to new protocols to optimize performance and efficiency for IoT devices. As a result, one or more technical solutions may provide an ability to increase the efficiency and performance of IoT devices in computer system 204.

For example, if a warehouse is equipped with numerous Radio Frequency Identification (RFID) sensors and a wide range of smartphones for managing inventory and tracking shipments. However, there may be challenges related to the performance and interoperability of the IoT protocols used in these devices. For example, the challenges can include communication bottlenecks, high latency, and data inconsistencies that impede operational efficiency and impact decision-making.

In this example, protocol manager 212 can be implemented in the warehouse. protocol manager 212 can continuously monitor the performance of IoT protocols, tracking network latency, packet loss, and device connectivity. By analyzing the above mentioned data, the application provides owner of warehouse with valuable insights into the health and effectiveness of the protocols. As a result, the owner of the warehouse can proactively address any suboptimal performance, optimize the protocols, and predict when an upgrade is necessary. This enables him to ensure smooth warehouse operations, streamline inventory management, and enhance overall efficiency.

In yet another example, protocol manager 212 can be used for monitoring and prediction system is utilized by a company to address protocol migration challenges. protocol manager 212 can perform an assessment to evaluate the readiness and compatibility of the existing protocols. In this example, the application helps in identifying bottlenecks and suboptimal performance by monitoring key performance indicators. As a result, protocol manager 212 can provide recommendations for protocol upgrades and offer efficient migration strategies for smooth transition.

In yet another example, the intelligent monitoring and predictive analysis system is deployed in a farm to enhance IoT protocol management. In this illustrative example, optimizing IoT protocols is critical because IoT devices play a crucial role in smart farming practices such as soil monitoring, irrigation control, and livestock management. Protocol manager 212 can be implemented in the farm to continuously monitor the performance of protocols across diverse devices, networks, and applications used in agriculture.

In this illustrative example, farmers and agricultural businesses gain insights into protocol effectiveness by tracking indicators like network latency, packet loss, and device connectivity. In addition, protocol manager 212 can also provide predictive analytics to enable forecasting of the need for protocol upgrades for ensuring reliable data transmission, efficient resource management, and improved agricultural yield. Protocol manager 212 can support the agriculture industry in harnessing the power of IoT, optimizing protocols, and making informed decisions for sustainable farming practices.

Therefore, computer system 204 is configured to perform at least one of the steps, operations, or actions described in the different illustrative examples using software, hardware, firmware, or a combination thereof. As a result, computer system 204 operates as a special purpose computer system in which protocol manager 212 in computer system 204 enables optimization of protocols for IoT devices. In particular, protocol manager 212 transforms computer system 204 into a special purpose computer system as compared to currently available general computer systems that do not have a protocol manager 212.

The illustration of protocol management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, protocol manager 212 can further compare legacy protocols 248 with actual legacy protocols to evaluate performance of machine learning models 242 and retrain machine learning models 242 by including legacy protocols 248 into training data 220.

Figure 3:
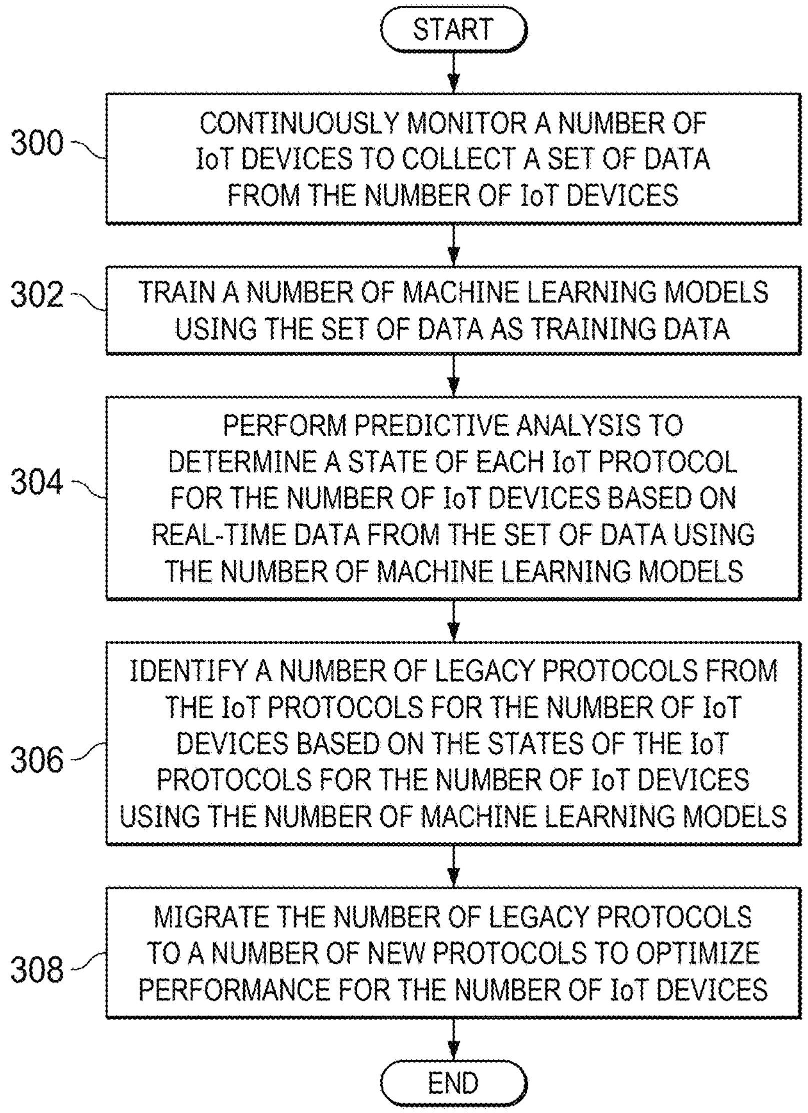
FIG. 3 is a flowchart of a process for managing IoT protocols in accordance with an illustrative embodiment.

With reference now to FIG. 3, a flowchart illustrating a process for managing IoT protocols is shown in accordance with an illustrative embodiment. The process in FIG. 3 can be implemented in hardware, software, or both. When implemented in software, the process can take the form of program instructions that are run by one of more processor units located in one or more hardware devices in one or more computer systems. For example, the process can be implemented in protocol manager 212 in computer system 204 in FIG. 2.

The process begins by continuously monitoring a number of IoT devices to collect a set of data from the number of IoT devices (step 300). In step 300, the set of data is associated with IoT protocols and performance for the number of IoT devices. The process trains a number of machine learning models using the set of data as training data (step 302).

The process performs predictive analysis to determine a state of each IoT protocol for the number of IoT devices based on real-time data from the set of data using the number of machine learning models (step 304). The process identifies a number of legacy protocols from the IoT protocols for the number of IoT devices based on the states of the IoT protocols for the number of IoT devices using the number of machine learning models (step 306). The process migrates the number of legacy protocols to a number of new protocols to optimize performance for the number of IoT devices (step 308). The process terminates thereafter.

Figure 4:
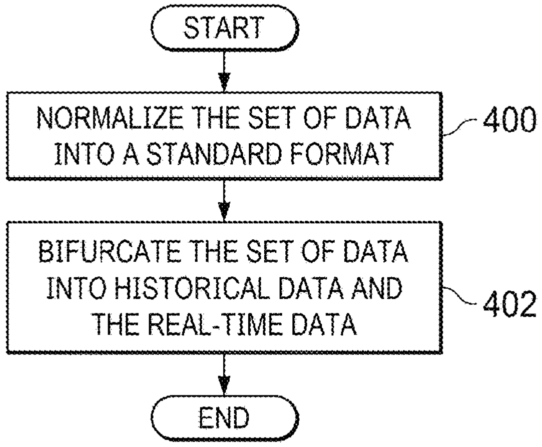
FIG. 4 is a flowchart of a process for bifurcating data in accordance with an illustrative embodiment.

Turning next to FIG. 4, a flowchart of a process for bifurcating data is depicted in accordance with an illustrative embodiment. The process in this flowchart is an example of an implementation for step 300 in FIG. 3.

The process begins by normalizing the set of data into a standard format (step 400). The process bifurcates the set of data into historical data and the real-time data (step 402). In this step, the historical data and the real-time data are stored in different databases. The process terminates thereafter.

Figure 5:
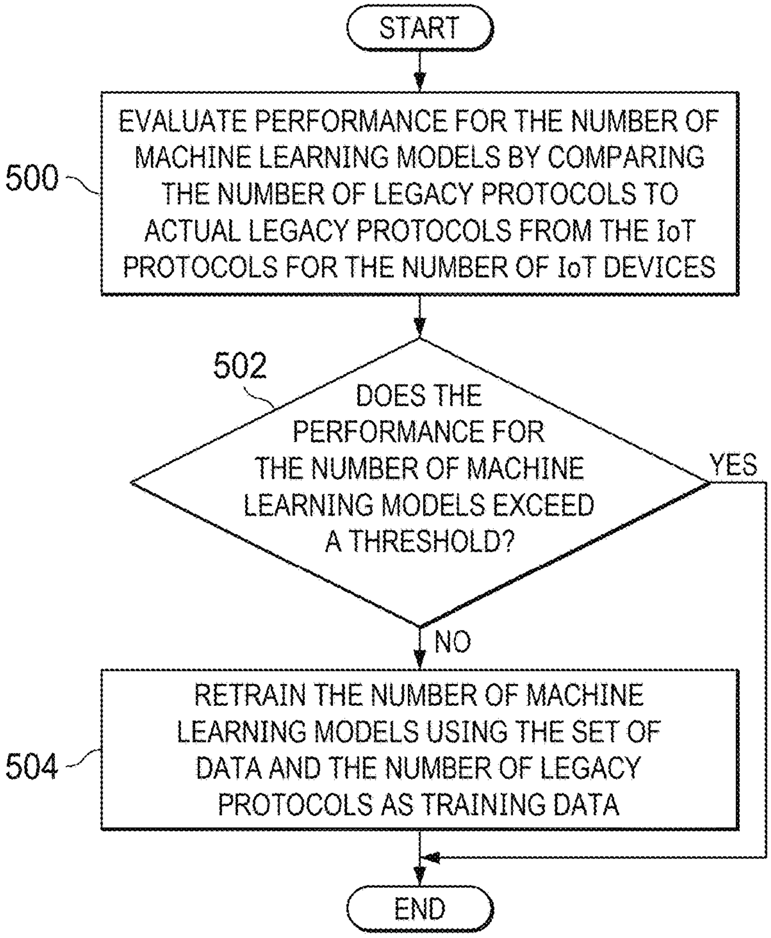
FIG. 5 is a flowchart of a process for retraining machine learning models in accordance with an illustrative embodiment.

Turning next to FIG. 5, a flowchart of a process for retraining machine learning models is depicted in accordance with an illustrative embodiment. The process in this figure is an example of an additional step that can be performed with the steps in FIG. 3.

The process begins by evaluating performance for the number of machine learning models by comparing the number of legacy protocols to actual legacy protocols from the IoT protocols for the number of IoT devices (step 500). The process determines whether the performance for the number of machine learning models exceeds a threshold (step 502). In step 502, the threshold is a pre-defined threshold specified by a user.

If the performance for the number of machine learning models exceeds a threshold, the process terminates thereafter. With reference again to step 502, if the performance for the number of machine learning models does not exceed a threshold, the process retrains the number of machine learning models using the set of data and the number of legacy protocols as training data (step 504). The process terminates thereafter.

Figure 6:
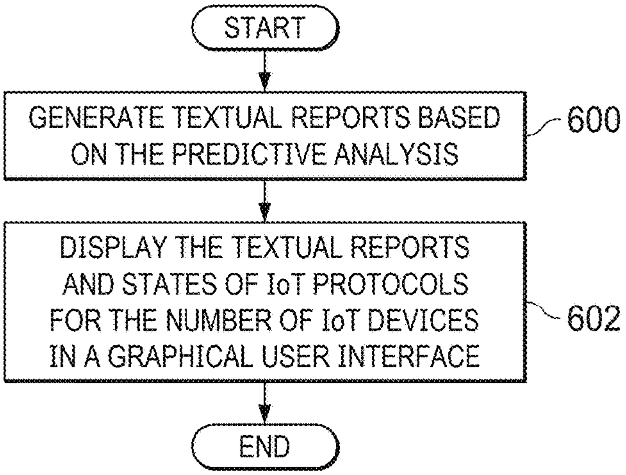
FIG. 6 is a flowchart of a process for displaying reports and states of IoT protocols in accordance with an illustrative embodiment.

Turning next to FIG. 6, a flowchart of a process for displaying reports and states of IoT protocols in a graphical user interface is depicted in accordance with an illustrative embodiment. The process in this figure is an example of an additional step that can be performed with the steps in FIG. 3.

The process begins by generating textual reports based on the predictive analysis (step 600). In this step, the textual reports are generated for the number of IoT devices. The process displays the textual reports and states of IoT protocols for the number of IoT devices in a graphical user interface (step 602). The process terminates thereafter.

Figure 7:
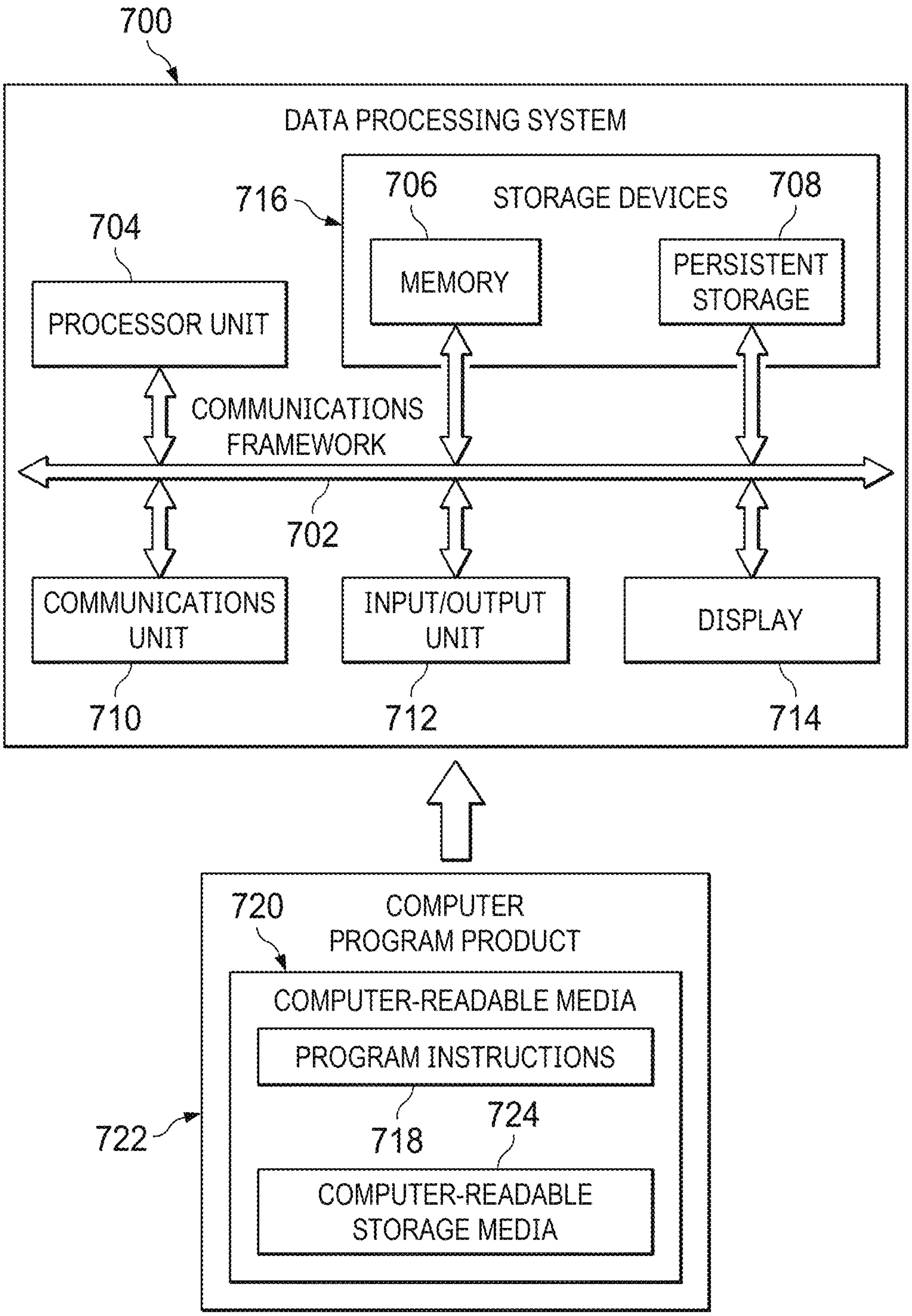
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement computers and computing devices in computing environment 100 in FIG. 1. Data processing system 700 can also be used to implement computer system 204 in FIG. 2. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 704 can be implemented using one or more heterogeneous processor systems in which a main processor is present with secondary processors on a single chip. As another illustrative example, processor unit 704 can be a symmetric multiprocessor system containing multiple processors of the same type on a single chip.

Memory 706 and persistent storage 708 are examples of storage devices 716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program instructions, computer usable program instructions, or computer-readable program instructions that can be read and executed by a processor in processor unit 704. The program instructions in the different embodiments can be embodied on different physical or computer-readable storage media, such as memory 706 or persistent storage 708.

Program instructions 718 are located in a functional form on computer-readable media 720 that is selectively removable and can be loaded onto or transferred to data processing system 700 for execution by processor unit 704. Program instructions 718 and computer-readable media 720 form computer program product 722 in these illustrative examples. In the illustrative example, computer-readable media 720 is computer-readable storage media 724.

Computer-readable storage media 724 is a physical or tangible storage device used to store program instructions 718 rather than a medium that propagates or transmits program instructions 718. Computer-readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 718 can be transferred to data processing system 700 using a computer-readable signal media. The computer-readable signal media are signals and can be, for example, a propagated data signal containing program instructions 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 720" can be singular or plural. For example, program instructions 718 can be located in computer-readable media 720 in the form of a single storage device or system. In another example, program instructions 718 can be located in computer-readable media 720 that is distributed in multiple data processing systems. In other words, some instructions in program instructions 718 can be located in one data processing system while other instructions in program instructions 718 can be located in one data processing system. For example, a portion of program instructions 718 can be located in computer-readable media 720 in a server computer while another portion of program instructions 718 can be located in computer-readable media 720 located in a set of client computers.

The different components illustrated for data processing system 700 are not meant to provide architectural limitations to the manner in which different embodiments can be implemented. In some illustrative examples, one or more of the components may be incorporated in or otherwise form a portion of another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program instructions 718.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing Internet of Things (IoT) protocols, the computer implemented method comprising:

continuously monitoring, by a processor set, a number of IoT devices to collect a set of data from the number of IoT devices, wherein the set of data is associated with IoT protocols and performance for the number of IoT devices;

training, by the processor set, a number of machine learning models using the set of data as training data;

performing, by the processor set using the number of machine learning models, predictive analysis to determine a state of each IoT protocol for the number of IoT devices based on real-time data from the set of data;

identifying, by the processor set using the number of machine learning models, a number of legacy protocols from the IoT protocols for the number of IoT devices based on the state of the IoT protocol for the number of IoT devices;

identifying, by the processor set, a number of new protocols for the number of legacy protocols by comparing metrics for IoT devices from the number of IoT devices that are using the number of legacy protocols to metrics for other devices that previously used the number of legacy protocols and have migrated to the number of new protocols; and migrating, by the processor set, the number of legacy protocols to the number of new protocols to optimize performance for the number of IoT devices.

2. The computer implemented method of claim 1, wherein the continuously monitoring, by a processor set, a number of IT devices to collect a set of data from the number of IoT devices comprises:

normalizing, by the processor set, the set of data into a standard format; and bifurcating, by the processor set, the set of data into historical data and the real-time data, wherein the historical data and the real-time data are stored in different databases.

3. The computer implemented method of claim 1, further comprising:

evaluating, by the processor set, performance for the number of machine learning models by comparing the number of legacy protocols to actual legacy protocols from the IoT protocols for the number of IoT devices; and in response to determining that the performance for the number of machine learning models does not exceed a threshold, retraining, by the processor set, the number of machine learning models using the set of data and the number of legacy protocols as training data.

4. The computer implemented method of claim 1, further comprising:

generating, by the processor set, textual reports based on the predictive analysis; and displaying, by the processor set, the textual reports and states of IoT protocols for the number of IoT devices in a graphical user interface.

5. The computer implemented method of claim 1, wherein machine learning algorithms for the number of machine learning models comprises at least one of Random Forest algorithm, Gradient Boosting algorithm, and Autogressive Integrated Moving Average (ARIMA).

6. The computer implemented method of claim 1, wherein the number of IoT devices are monitored according to a number of pre-defined monitoring threshold.

7. The computer implemented method of claim 1, wherein the set of data is continuously updated in real-time using data received from the number of IoT devices using RESTful APIs.

8. A computer system for managing Internet of Things (IoT) protocols, comprising:

a processor set;

a set of one or more computer-readable storage media; and program instructions stored on the set of one or more storage media to cause the processor set to perform operations comprising:

continuously monitoring a number of IoT devices to collect a set of data from the number of IoT devices, wherein the set of data is associated with IoT protocols and performance for the number of IoT devices;

training a number of machine learning models using the set of data as training data;

performing predictive analysis to determine a state of each IoT protocol for the number of IoT devices based on real-time data from the set of data using the number of machine learning models;

identifying a number of legacy protocols from the IoT protocols for the number of IoT devices based on the states of the IoT protocols for the number of IoT devices using the number of machine learning models;

identifying a number of new protocols for the number of legacy protocols by comparing metrics for IoT devices from the number of IoT devices that are using the number of legacy protocols to metrics for other devices that previously used the number of legacy protocols and have migrated to the number of new protocols; and migrating the number of legacy protocols to a number of new protocols to optimize performance for the number of IoT devices.

9. The computer system of claim 8, wherein the continuously monitoring a number of IoT devices to collect a set of data from the number of IoT devices comprises:

normalizing the set of data into a standard format; and bifurcating the set of data into historical data and the real-time data, wherein the historical data and the real-time data are stored in different databases.

10. The computer system of claim 8, wherein the operations further comprise:

evaluating performance for the number of machine learning models by comparing the number of legacy protocols to actual legacy protocols from the IoT protocols for the number of IoT devices; and in response to determining that the performance for the number of machine learning models does not exceed a threshold, retraining the number of machine learning models using the set of data and the number of legacy protocols as training data.

11. The computer system of claim 8, wherein the operations further comprise:

generating textual reports based on the predictive analysis; and displaying the textual reports and states of IoT protocols for the number of IoT devices in a graphical user interface.

12. The computer system of claim 8, wherein machine learning algorithms for the number of machine learning models comprises at least one of Random Forest algorithm, Gradient Boosting algorithm, and Autogressive Integrated Moving Average (ARIMA).

13. The computer system of claim 8, wherein the number of IoT devices are monitored according to a number of pre-defined monitoring threshold.

14. The computer system of claim 8, wherein the set of data is continuously updated in real-time using data received from the number of IoT devices using RESTful APIs.

15. A computer program product, comprising:

a set of one or more computer-readable storage media;

program instructions stored in the set of one or more computer-readable storage media to perform operations comprising:

continuously monitoring, by a processor set, a number of IoT devices to collect a set of data from the number of IoT devices, wherein the set of data is associated with IoT protocols and performance for the number of IoT devices;

training, by the processor set, a number of machine learning models using the set of data as training data;

performing, by the processor set using the number of machine learning models, predictive analysis to determine a state of each IoT protocol for the number of IoT devices based on real-time data from the set of data;

identifying, by the processor set using the number of machine learning models, a number of legacy protocols from the IoT protocols for the number of IoT devices based on the states of the IoT protocols for the number of IoT devices;

identifying, by the processor set, a number of new protocols for the number of legacy protocols by comparing metrics for IoT devices from the number of IoT devices that are using the number of legacy protocols to metrics for other devices that previously used the number of legacy protocols and have migrated to the number of new protocols; and migrating, by the processor set, the number of legacy protocols to a number of new protocols to optimize performance for the number of IoT devices.

16. The computer program product of claim 15, wherein the continuously monitoring, by a processor set, a number of IoT devices to collect a set of data from the number of IoT devices comprises:

normalizing, by the processor set, the set of data into a standard format; and bifurcating, by the processor set, the set of data into historical data and the real-time data, wherein the historical data and the real-time data are stored in different databases.

17. The computer program product of claim 15, wherein the operations further comprise:

evaluating, by the processor set, performance for the number of machine learning models by comparing the number of legacy protocols to actual legacy protocols from the protocols for the number of IoT devices; and in response to determining that the performance for the number of machine learning models does not exceed a threshold, retraining, by the processor set, the number of machine learning models using the set of data and the number of legacy protocols as training data.

18. The computer program product of claim 15, wherein the operations further comprise:

generating, by the processor set, textual reports based on the predictive analysis; and displaying, by the processor set, the textual reports and states of IoT protocols for the number of IoT devices in a graphical user interface.

19. The computer program product of claim 15, wherein machine learning algorithms for the number of machine learning models comprises at least one of Random Forest algorithm, Gradient Boosting algorithm, and Autogressive Integrated Moving Average (ARIMA).

20. The computer program product of claim 15, wherein the number of IoT devices are monitored according to a number of pre-defined monitoring threshold.

* * * * *